United States Patent [19]

Bell

[11] Patent Number: 4,785,323

[45] Date of Patent: Nov. 15, 1988

[54] EXPOSURE CONTROL

[75] Inventor: Cynthia S. Bell, Webster, N.Y.

[73] Assignee: Eastman Kodak Company, Rochester, N.Y.

[21] Appl. No.: 137,898

[22] Filed: Dec. 28, 1987

[51] Int. Cl.$^4$ .............................................. G03B 7/097
[52] U.S. Cl. .................................................. 354/443
[58] Field of Search ............... 354/421, 422, 412, 441, 354/442, 443

[56] References Cited

U.S. PATENT DOCUMENTS

| | | | |
|---|---|---|---|
| 3,522,764 | 8/1970 | Biber et al. | 95/44 |
| 3,945,023 | 3/1976 | Stauffer | 354/25 |
| 4,320,948 | 3/1982 | Hosoe et al. | 354/442 X |
| 4,329,031 | 5/1982 | Carcia et al. | 354/23 D |
| 4,345,825 | 8/1982 | Matteson et al. | 354/23 D |
| 4,345,829 | 8/1982 | Shimbori et al. | 354/443 |
| 4,354,748 | 10/1982 | Grimes et al. | 354/23 D |
| 4,362,372 | 12/1982 | Kiesel | 354/195 |
| 4,427,276 | 1/1984 | Feinerman et al. | 354/412 |
| 4,437,744 | 3/1984 | Terui et al. | 354/442 |
| 4,474,451 | 10/1984 | Mizokami | 354/443 X |
| 4,497,562 | 2/1985 | Ishida | 354/443 X |
| 4,512,648 | 4/1985 | Mizokami | 354/443 |
| 4,525,054 | 6/1985 | Someya et al. | 354/443 |
| 4,529,291 | 7/1985 | Mizogui | 354/443 |
| 4,609,274 | 9/1986 | Iwashita et al. | 354/442 X |
| 4,653,893 | 3/1987 | Inoue et al. | 354/443 |
| 4,709,138 | 11/1987 | Suda et al. | 354/443 X |

Primary Examiner—W. B. Perkey
Attorney, Agent, or Firm—Donald D. Schaper

[57] ABSTRACT

An exposure control is disclosed for controlling the amount of light admitted to a light-responsive medium in photographic apparatus such as a camera. The control is adapted to generate a plurality of shutter-aperture options in response to measurements of subject distance and ambient light. The exposure control contains a means for selecting one of the options to produce a suitable exposure. In order to maximize the overall picture quality, the exposure control comprises means for selecting the shutter-aperture option with the optimum depth of field to blur diameter ratio.

8 Claims, 5 Drawing Sheets

EXPOSURE CONTROL

This application relates to an exposure control for photographic apparatus, and more particularly to an exposure control which optimizes overall picture quality.

A good picture from a photographic camera must be properly exposed, be in sharp focus, and have good depth of field. The picture must also meet the viewer's perception of what constitutes a good picture. For most viewers, the most desirable picture is the one which most closely resembles the human perception of a scene. It is well known that, for pictures of equal sharpness, the quality of close subjects is perceived to be better than that of distant subjects. This is largely a reflection of the amount of information or detail that can be discerned in the image. It is also well known that, for two pictures of equal sharpness, the one with the greater depth of field will be perceived to be of higher quality. Small aperture settings will increase the depth of field, but the associated shutter speeds also get longer. Slow shutter speeds increase blur, which is a lack of sharpness, from sources such as motion of the subject and the camera. Thus, it is a problem in regulating exposure in a camera to find a balance between depth of field and an acceptable amount of blur in order to achieve a consistent level of perceived quality.

In U.S. Pat. No. 4,362,372, there is disclosed a focusing system for photographic cameras in which the focusing adjustment of the camera lens is automatically modified to account for the depth of focus for a given aperture size. The aperture size is determined in accordance with scene light level, the subject distance is determined by a range finder, and a signal is generated which is representative of the depth of focus for the determined aperture size. The lens is then adjusted to a distance greater than that determined by the range finder in accordance with the depth of field available for the determined aperture size. Although such a system provides an increased depth of field, it is not precise enough to provide optimum results over a wide range of subject distances.

In U.S. Pat. No. 4,345,825, an automatic control apparatus for a camera is disclosed which utilizes a set of stored values representing a mapping function. The mapping function defines the adjustment of the exposure control mechanism for particular combinations of scene values including scene brightness and subject distance. The mapping function is obtained by maximizing a composite quality factor which includes one or more subjective quality factors representing blur, smear, and exposure evaluated at the subject distance and at a plurality of background distances. Although such an apparatus represents an improvement in exposure control devices, a problem with the apparatus is that the camera settings produced by the apparatus are not optimized for sharpness and depth of field in accordance with scene illumination level, distance to the subject, and limitations of the photographic apparatus used.

SUMMARY OF THE INVENTION

It is an object of the invention to overcome the problems in the prior art and to provide an exposure control in which the exposure parameters are optimized to balance sharpness and depth of field for a particular scene condition.

In accordance with one aspect of the present invention, there is provided an exposure control comprising: means for measuring the level of ambient light; means for generating a plurality of exposure options for the measured level of light; means for measuring the distance to a subject; means for determining a parasitic system blur for each of the options at the measured distance; means for determining a maximum depth of field for each of the options; means for selecting the option with the optimum depth of field to blur ratio; and means for controlling an exposure in accordance with the option having the optimum ratio.

In one embodiment of the present invention, the exposure control includes a photosensitive element for measuring the level of ambient light, and a means for generating a plurality of aperture-shutter options based on the measured scene light. A range finder is adapted to measure the distance to a subject, and the depth of field and blur are calculated for each of the options. The option with the optimum depth of field to blur ratio is selected to make the exposure.

A principal advantage of the present invention is that it yields consistent perceived quality as well as accurate exposures over a wide range of subject distances. For close subjects, the aperture is kept small to maintain depth of field. As the subject moves farther away, the optimum exposure parameters shift to a slightly larger aperture and a faster shutter speed; this reduces blur from camera shake and subject motion, while the depth of field of maintained.

Other features and advantages will become apparent with reference to the following Description of the Preferred Embodiment when read in light of the attached drawings.

DESCRIPTION OF PREFERRED EMBODIMENTS

The term "blur" as used herein refers to a factor which determines the sharpness of an image and hence the detail with which an object is reproduced. The term "blur diameter" is used to designate the diameter of an image in the image plane which is produced by a point in the object plane.

The exposure control of the present invention is particularly suitable for use with a camera mechanism as shown in U.S. Pat. No. 4,345,825, issued Aug. 24, 1982, and the disclosure in this patent is expressly incorporated herein by reference.

Figure 1:
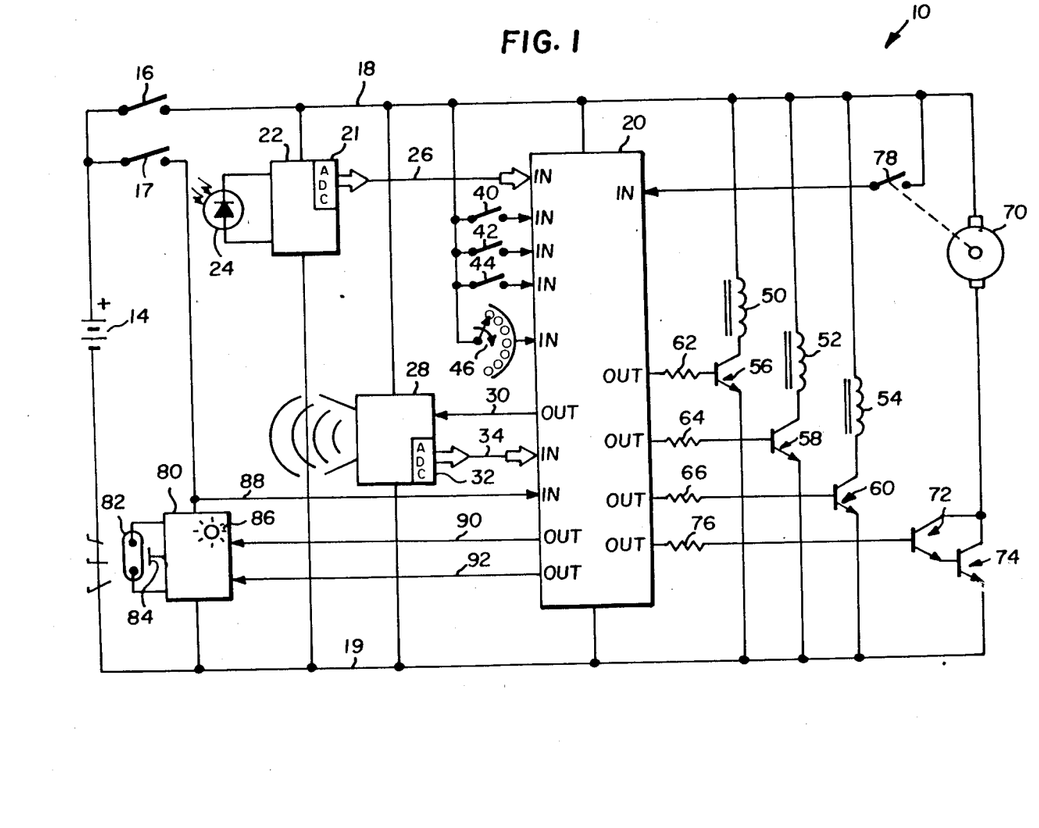
FIG. 1 is a schematic diagram of the exposure control of the present invention.

With reference to FIG. 1, there is shown a schematic diagram of the exposure control 10 of the present invention. As shown in FIG. 1, power is provided by a battery 14, the positive terminal of which is connected to a main power switch 16 and a manually operated flash power switch 17. The main power switch 16, when closed, connects the positive terminal of the battery to a positive bus 18. The negative terminal of the battery is connected to a return bus 19. A logic and control unit 20 is connected between positive bus 18 and return bus 19.

A light sensitive circuit 22 is connected between positive bus 18 and the return bus 19. The light sensitive circuit 22 includes a photosensitive element 24, such as a silicon photodiode, and suitable signal processing electronics for generating a signal $B_s$ which is proportional to the brightness of the subject. Circuit 22 can be of a type well known in the art which provides an output signal representative of the brightness of a scene. The signal $B_s$ is converted to a digital signal by an analog-to-digital converter 21 which supplies the digital signal to unit 20 on a line 26.

An automatic range finding device 28 is also connected between positive bus 18 and return bus 19. Device 28 can be of a type known in the art, for example, the device disclosed in U.S. Pat. No. 3,522,764, granted Aug. 4, 1970, or the range finding device disclosed in U.S. Pat. No. 3,945,023, granted Mar. 16, 1976. The range finding device, when signalled by the logic and control unit 20 via line 30 determines the distance to the subject, and generates a signal $D_s$ indicative of this distance. Signal $D_s$ passes through an analog-to-digital converter 32 which supplies a digital signal to unit 20 on a line 34.

Exposure control 10, as disclosed herein is adapted to function with an adjustable mechanism (not shown). Such a mechanism can be constructed, for example, as disclosed in the aforementioned U.S. Pat. No. 4,345,825. As shown in this patent, the adjustable mechanism includes an adjustable lens mechanism, a pair of shutter blades, and a pair of aperture blades all of which are arranged to control the amount of light which is focused onto a photosensitive surface.

A control switch 40, a control switch 42, a control switch 44, and a position sensor 46 are connected in parallel between positive bus 18 and unit 20. Control switch 40 indicates when the shutter is open, control switch 42 directs the circuit 22 to measure scene light and the device 28 to measure subject distance, control switch 44 actuates the shutter blades (not shown) to take a picture, and sensor 46 indicates the relative position of the lens (not shown).

An electromagnet 50, an electromagnet 52, and an electromagnet 54 are all connected between the positive bus 18 and return bus 19 through the collector-to-emitter paths of transistors 56, 58, 60, respectively. Electromagnet 50 actuates a lens position latch (not shown), electromagnet 52 actuates a shutter blade latch (not shown), and electromagnet 54 actuates an aperture position latch (not shown). The base electrodes of the transistors 56, 58, and 60, are connected to the unit 20 through resistors 62, 64, and 66, respectfully.

Positive bus 18 is connected to one input of a motor 70 which is adapted to drive certain elements (not shown) of the shutter mechanism. Motor 70 is controlled by transistor pair 72 and 74 connected in a Darlington configuration in the return leg of the motor circuit. The base of transistor 72 is connected through resistor 76 to the unit 20. Switch 78 is operatively connected to motor 70 and electrically connected to the positive bus 18 to provide a signal to unit 20.

Switch 17 is closed by a camera operator to supply power to an electronic flash circuit 80. The flash circuit is of a type which employs a flash tube 82 that is energized by a relatively high voltage developed on a firing capacitor (not shown). The flash tube 82 has a trigger electrode 84 and a ready light 86. Power input to the flash circuit from switch 17 is also connected to an input of the unit 20 by a line 88 to indicate to the control system when the flash device is powered. The signal controlling the firing of the flash circuit 80 is supplied from the unit 20 by a line 90, and the quench signal is supplied from unit 20 by a line 92.

Figure 2:
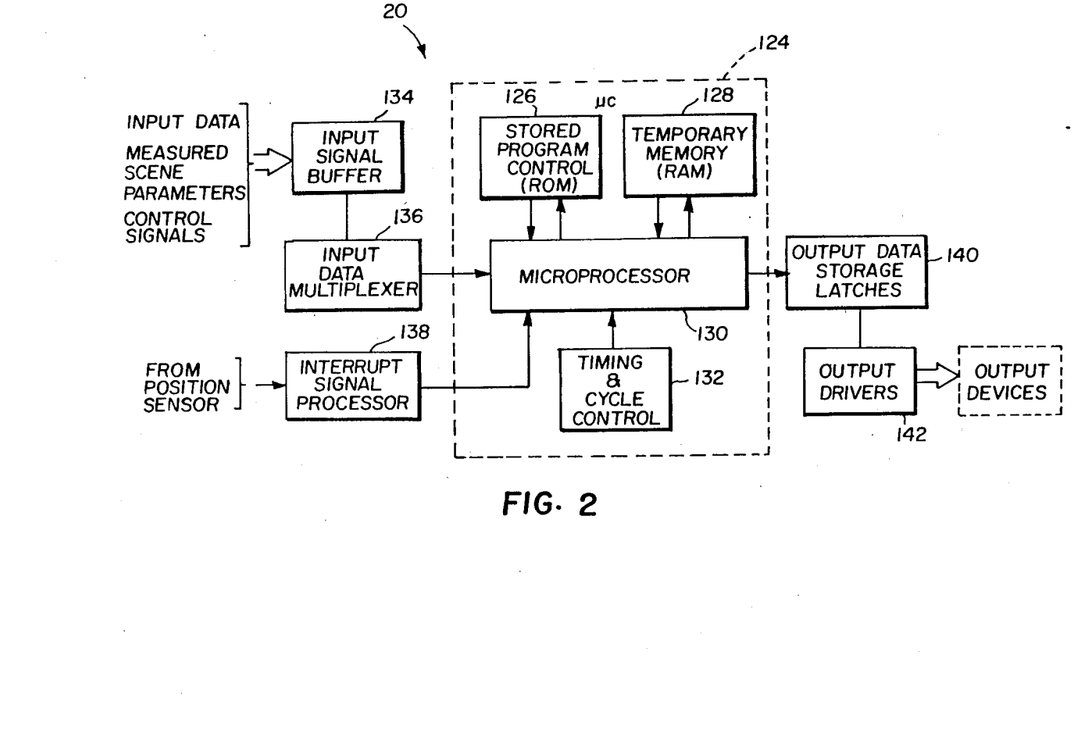
FIG. 2 is a block diagram of the logic and control unit in the exposure control.

As shown in FIG. 2, logic and control unit 20 comprises a microcomputer 124 which includes a stored program control member 126, a temporary data storage memory 128, a microprocessor 130, and a timing and cycle control unit 132. Input data are supplied through an input signal buffer 134 to an input data multiplexer 136 or directly to microprocessor 130 through an interrupt signal processor 138. The input signals to the input data multiplexer 136 are derived from the various control switches 40, 42, 44, and 78, and the measured scene parameters are derived from analog-to-digital converters 21 and 32. The input signal to the interrupt signal processor 138 is derived from a lens position sensor (not shown). The output data and control signals are applied to storage latches 140 which, in turn, provide suitable control signals to output drivers 142. The output drivers 142 are directly coupled to leads which supply control signals to output devices such as the motor 70 and electromagnets 50, 52, and 54.

When it is desired to take a picture, the photographer depresses the shutter release (not shown) which closes switch 16 to furnish power to the exposure control 10. The logic and control unit 20 then completes an initialization procedure, obtains scene parameters, determines exposure parameters in accordance with the present invention as will be explained hereinafter, and provides inputs to the camera mechanism to expose the film using these exposure parameters. The operations of the logic and control unit 20, with the exception of the determination of the exposure parameters, do not form a part of the present invention, and thus, they are not described in detail herein; those operations not described herein can be performed, for example, as disclosed in the aforesaid U.S. Pat. No. 4,345,825.

Figure 3:
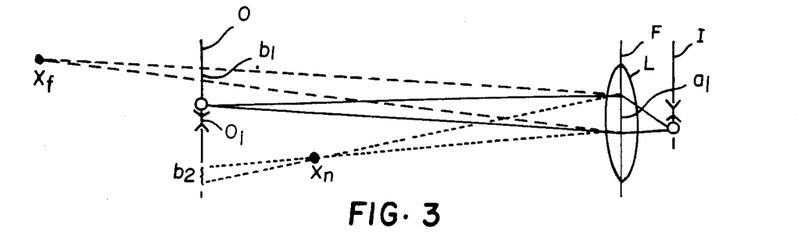
FIGS. 3 and 4 are schematic illustrations showing the effect of aperture size on depth of field.
Figure 4:
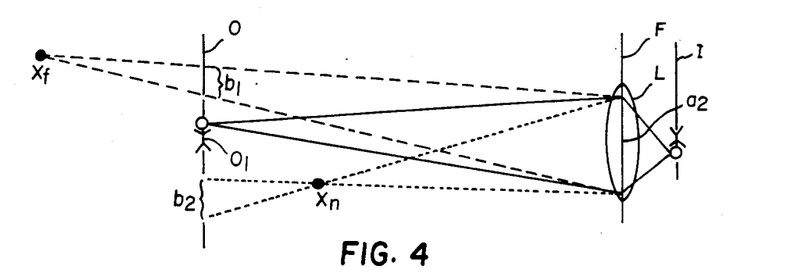

The determination of the exposure control parameters in accordance with the present invention will now be described with reference to FIGS. 3-7. In FIGS. 3 and 4, there is shown the relationship between depth-of-field and aperture. In FIG. 3, the perimeter rays corresponding to a small aperture $a_1$ of a lens L located along a plane F are drawn for subjects at three positions. The plane designated 0 represents the object plane. Ideally, points from an object $0_1$ in object plane 0 are imaged as points in an image plane I. A point $X_f$ is located in a plane behind the object, and a point $X_n$ is in a plane in front of the object. Rays from points, such as $X_f$ and $X_n$, are ideally reimaged as they appear in the object plane 0, i.e., as circles of diameter $b_1$ and $b_2$. By noting the change in diameters of $b_1$ and $b_2$ between FIG. 3 and in FIG. 4, the effect of aperture on depth of field can be seen. A larger aperture $a_2$ in FIG. 4 admits rays from a larger cone angle, and they intersect the object plane 0 as larger circles. These circles may be perceptibly large, reproducing an unsharp image of that plane. Thus, a smaller aperture would increase the depth-of-field by effecting smaller circle diameters. As will be seen from the discussion which follows, the final choice of aperture also involves other factors.

The depth-of-field is determined by choosing a blur diameter that will serve as the limit for things that appear sharp. All points from the scene reimaged within this diameter will be judged to be within the depth-of-field. For a given blur on a print, the corresponding blur in the object plane or the image plane is $$b'' = M_2 b' = \frac{M_2 b}{M_1} \quad (1)$$

where
 $b''$ is the blur on the print
 $b'$ is the blur in the image plane
 $b$ is the blur in the object plane
 $M_1$ is the taking lens magnification
 $M_2$ is the printing lens magnification.

Figure 5:
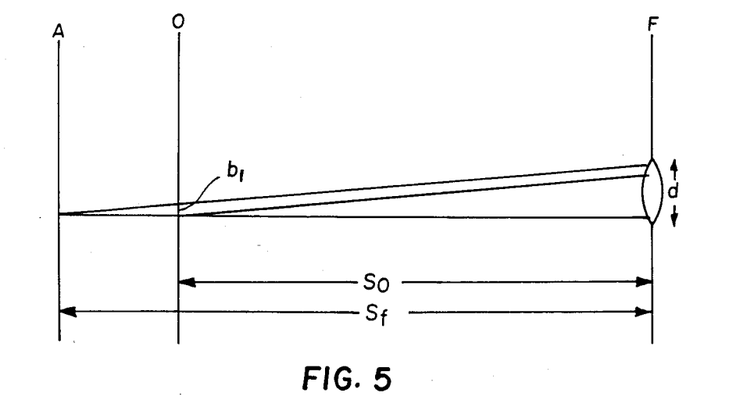
FIG. 5 is a schematic illustration showing the elements used in calculating depth of field.

The distances to near and far planes that will appear sharp, and thus the planes that define the depth-of-field, can be calculated. With reference to FIG. 5, the line designated 0 represents the object plane, A represents a plane behind the object, and a point from the A plane would ideally be imaged as a circle of diameter $b_1$. The distances to the planes 0 and A are denoted $S_0$ and $S_f$, respectively. From the geometry of similar triangles, $$\frac{S_f}{d} = \frac{S_O}{(d - b_1)} \quad (2a)$$

or $$S_f = \frac{S_O d}{(d - b_1)}$$

and denoting
 f=taking lens focal length
 F=working F/# (aperture)
then substituting, $$d = \frac{f}{F} \quad (2b)$$

$$S_f = \frac{S_O}{\left(1 - b_1 \frac{F}{f}\right)}$$

gives the far plane in focus, $S_f$, relative to the object plane distance, taking lens focal length, aperture, and out-of-focus blur from a point at $S_f$ as ideally reimaged. To express the object plane blur diameter, $b_1$, referenced to the final print, equation (1) can be rearranged and incorporated to give $$S_f = \frac{S_O}{\left(1 - b_1'' \frac{F M_1}{M_2 f}\right)}$$

and using $$M_1 = \frac{S_O}{f}$$

(valid for $S_0 \gg f$)

$$S_f = \frac{S_O}{\left(1 - b_1'' \frac{F S_O}{M_2 f^2}\right)} \quad (2c)$$

-continued or $$\frac{1}{S_f} = \frac{1}{S_O} - b_1'' \frac{F}{M_2 f^2}$$

Similarly, a near plane in focus, $S_n$, can be expressed as $$\frac{1}{S_n} = \frac{1}{S_O} + b_2'' \frac{F}{M_2 f^2} \quad (2d)$$

Then by setting $b_1''$ and $b_2''$ equal to the on-print blur diameter perceived as sharp, the near and far planes in focus can be calculated. The depth-of-field is subsequently determined by $$\text{Depth-of-field} = S_f - S_n \quad (3)$$

From (2c) and (2d) it can be seen that the maximum depth-of-field will occur when $b''F/M_2 f^2$ is maximized. Since the distance to the far plane in focus, $S_f$, can go to infinity, it is preferable to work with the blur term rather than the depth of field directly.

In an actual system, even points in the object plane are not reimaged as points in the image plane. Various optical aberrations and the nature of the photosensitive media cause all points to be imaged as ellipses with some mean blur diameter. To find the analytical expression for optimization, we define the following blur variables:
 $b_{tol}''$=acceptable or tolerable blur diameter on print
 $b_T''$=resulting blur diameter from a point in object plane
 $b_{dof}''$=blur remaining for depth-of-field All points reimaged with a diameter less than $b_{tol}''$ will be considered in focus. $B_{tol}''$ serves as the sharpness boundary for depth-of-fields and for certain applications, a representative value is 0.005 inches. If the various sources of blur cause a point from the object plan to be reimaged with a diameter $b_T$, then $$b_{dof}'' = [(b_{tol}'')^2 - (b_T'')^2]^{0.5} \quad (4)$$

For actual systems, the near and far planes in-focus can then be found from (2c) and (2d) by $$\frac{1}{S_f} = \frac{1}{S_O} - b_{dof}'' \frac{F}{M_2 f^2} \quad (2e)$$

$$\frac{1}{S_n} = \frac{1}{S_O} + b_{dof}'' \frac{F}{M_2 f^2} \quad (2f)$$

A parameter defined as $$P_A = k \left\{ \frac{b_{dof}'' \frac{F}{M_2 f^2}}{b_T''} \right\} \quad (5)$$

can be used to find the best compromise between depth-of-field and sharpness. When the numerator of $P_A$ is largest, the depth-of-field will be largest. When the denominator is smallest, the parasitic blur, $b_T$, is smallest and the sharpness will be best. The best choice of exposure parameters can be determined by maximizing $P_A$. It has been found that, in general, the optimum depth of field to blur ratio is equal to one; however, other ratios may be selected for certain applications, for example in underwater photography. There are interactions between the numerator and denominator of equation (5) which will now be discussed further.

A definition of $b_T''$, the parasitic system blur, is given as $$b_T'' = [(b''_{camera\ shake})^2 + (b''_{subject\ motion})^2 + (b''_{focus\ errors})^2 + (b''_{diffraction})^2 + (b''_{MTF\ of\ lenses,\ film,\ paper})^2]^{0.5} \quad (6)$$

The blur contributors such as lenses, film and paper are quantified by their modulation transfer function. The blur introduced by these contributors is spatial in nature. In addition to these contributors, sources such as camera shake and subject motion introduce temporal blur to the image. In the following analysis, the blur contributors will be combined and compared as physical blur circles. The analysis can also be done by cascading in the modulation transfer function domain, but the results of the former are more readily comparable in actual picture tests.

Equations will be discussed for modeling each of the major quantifiable sources of blur. In all equations, the units for blur are inches. Also used in these descriptions, m=frequency at the 50% point on the MTF curve, cy/mm
e=diopter error, $m^{-1}$
p=focus error, % of distance to subject and as before,
b''=the blur on the print, inches
b'=the blur in the image plane, inches
b=the blur in the object plane, inches
$M_1$=the taking lens magnification
$M_2$=the printing lens magnification
$S_0$=the distance to the subject(object plane) feet
f=focal length of taking lens, mm
B=scene brightness, fL
k=proportionality constants
F=F/#
t=shutter speed, seconds
S=ASA of media The exposure required for a given ambient light level can be found from the well known photographic relationship, $$B = \frac{kF^2}{(tS)}$$

where
B=scene brightness, fL
k=constant, typically 3.6
F=F/#
t=shutter speed, seconds
S=ASA of media Thus, for a given light level, a number of exposure values, shutter speed and aperture combinations, will provide the desired exposure. However, for a particular distance to subject, an optimum shutter speed and aperture pair can be found.

The blur resulting from lens modulation can be characterized by a modulation transfer function (MTF). A MTF curve plots the modulation of a spatially varying signal transmitted by the lens. A typical MTF test plots the signal amplitude of sinusoids of increasing frequency. As the lines get thinner and closer together, they blur to an unresolved grey. MTF curves (not shown) for a particular camera lens can be constructed by methods well known in the art. To determine the blur circle diameter from an MTF curve, an equivalent spatial frequency is found. This can be done by integrating the area under the curve. A common approximation to the area calculation is to use the frequency where the modulation has dropped to 50% of maximum. The relationship to convert equivalent spatial frequency to blur circle diameter is based on the results of conversion methods well known in the art. The blur on the print is given by:

$$b''_{MTF} = \frac{kM_2}{m} \quad (8)$$

As one example, the MTF of an F/2.8 camera lens was measured with various apertures for complete characterization. The data were area weighted and averaged before conversion to blur circle diameter. The tests indicated that the lens performs best at three stops down from its fully-open position. To account for the printing lens, which is typically of very high quality, the assumption was made that it was f/20 diffraction limited. Film and paper can be characterized by the methods just described for lenses. A test pattern of line pairs of sinusoids imaged on the film yields modulation versus spatial frequency. The method for determining the equivalent blur circle diameter is also the same.

Another contributor to blur is camera motion. The motion is initially a result of depressing the shutter button. Additional shake is dependent on the steadiness of the photographer and exposure time. The amount of movement is both camera and user dependent, but can generally be accounted for by the following equation in which the exponent $\alpha$ was derived from experimental data collected from a set of operators with various levels of proficiency:

$$b''_{cam.\ shake} = kM_2 ft^\alpha \quad (9)$$

Movement of subject during the exposure also causes blur which is dependent on how long the shutter is open. The amount of blur is subject dependent and unknown until the moment of exposure. However, the effect is not negligible and should be included in the model. A relationship is found by working from the shutter speed at which subject motion is apparent and from data on print failures for fixed shutter speed cameras. The blur may be modeled as:

$$b''_{subject\ motion} = kM_2 tf \quad (10)$$

Diffraction effects increase blur as the aperture size decreases. For a circular aperture, the blur circle diameter due to diffraction may be found by applying the Rayleigh criterion for resolution. A more subjective approach relies on the fact that 84% of the total energy of the Airy Disc is distributed in the central spot. In both approaches, the equivalent blur circle is wavelength dependent. Green light (550 nm) is assumed, because the eye gets peak sharpness information from this wavelength. The relationship for blur is:

$$b''_{diffraction} = kFM_2 \quad (11)$$

The above diffraction equation should be omitted from equation (6) if measured lens MTF data, as opposed to calculated lens MTF data, is used in equation (8), since the effect of diffraction on blur will be reflected in the measured MTF data.

The last source of blur accounted for in herein is lens focus. It can be divided in two parts. The first part is a ratio error, such as would be found in a manual focus scheme or in an autofocus scheme subject to scene reflectivity variations. This type of error is proportional to the distance to the subject and consequently is specified as a percentage of the distance to subject. Blur due to focus error is computed by assuming the worst case, i.e., that the lens has been focused in front of the actual subject. The blur found from geometrical analysis to be:

$$b''_{lin.\ focus\ error} = \frac{kf^2 p\ M_2}{S_oF(1-p)} \quad (12)$$

The second type of focus error is a power error. This type of error results if the taking lens is improperly focused with respect to the film plane, if an autofocus system has a fixed offset error, or if there are other misalignment errors which do not change with distance to subject. The power error is specified in diopter form. The minimum diopter error can be determined by using the distance which the taking lens confuses with infinity:

$$e_{min} = \frac{1}{d} \quad (13)$$

where d = distance confused with infinity.

The blur circle diameter is found from geometrical analysis to be:

$$b_{dio.\ foc.\ error} = \frac{kf^2 M_2 e}{F} \quad (14)$$

The $b_{focus\ errors}$ in equation (6) is a combination of the values found in equations (12) and (14).

The computations described herein for optimizing the depth of field to blur diameter ratio can be performed by microcomputer 124 for each picture. However, since a relatively large number of computations are required, it is preferable to perform the computations at the manufacturer's facility and to then store the answers in memory 126 of microcomputer 124. The answers are stored in the form of a mapping function for subsequent recall in response to a given set of measured scene parameters.

Figure 7:
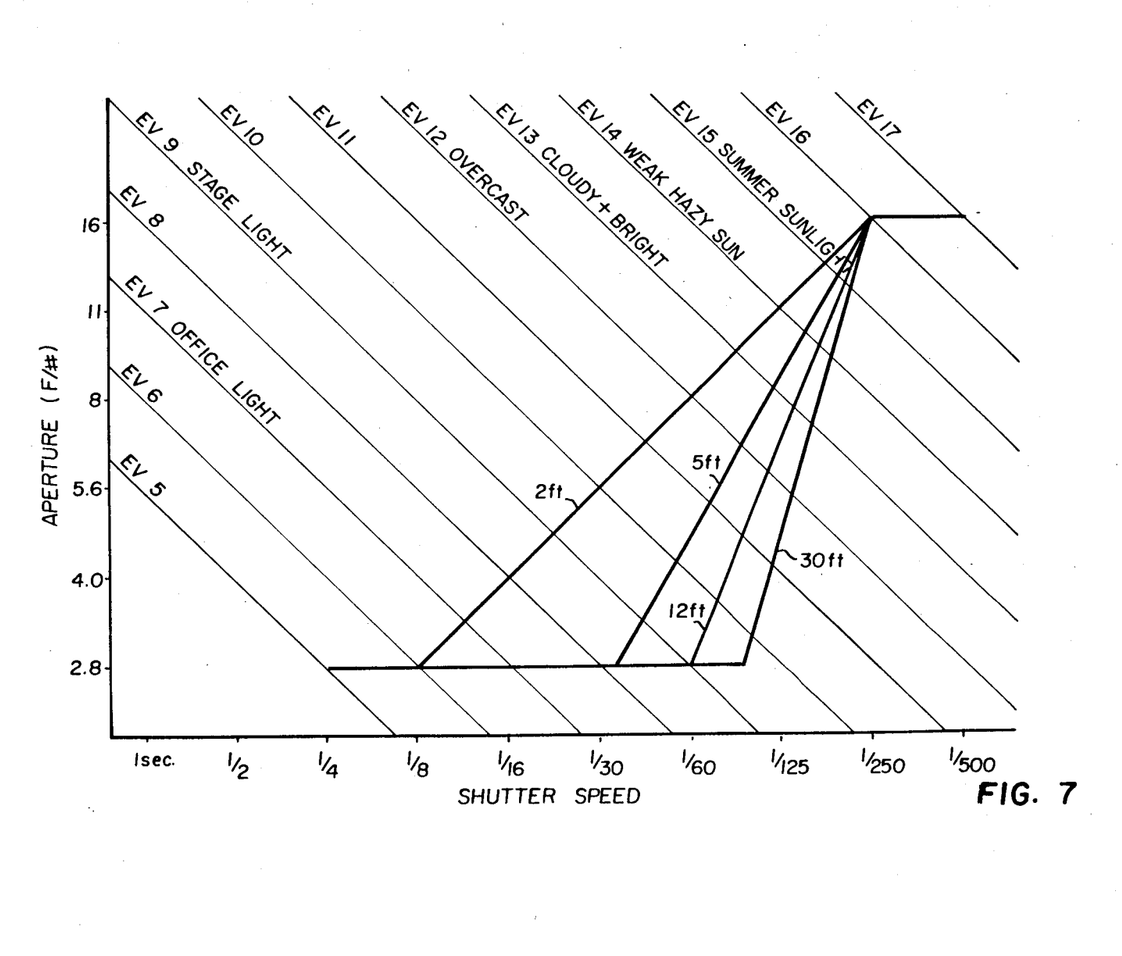
FIG. 7 is a graphical representation of exposure parameters produced by the present invention for a plurality of subject distances.

In the present invention, exposure parameters are produced which give optimum depth of field per unit blur. These parameters differ with distance to the subject as well as with light level. In FIG. 7, the exposure parameters are plotted for subject distances of 2, 5, 12, and 30 feet. Various light levels are indicated by the exposure value (EV) lines which range from EV 5 to EV 17. It will be seen from FIG. 7 that small apertures with slower shutter speeds are preferred for close-up work and fast shutter speeds with larger apertures are preferred for greater distances. An important feature of the present invention is that a different exposure curve is produced for each subject distance in order to achieve an optimum balance between sharpness and depth of field.

While the present invention has been described herein with reference to exposures made without flash, it will be apparent to those skilled in the art that the invention can be used in conjunction with flash to produce accurately exposed prints in all light levels.

Figure 6:
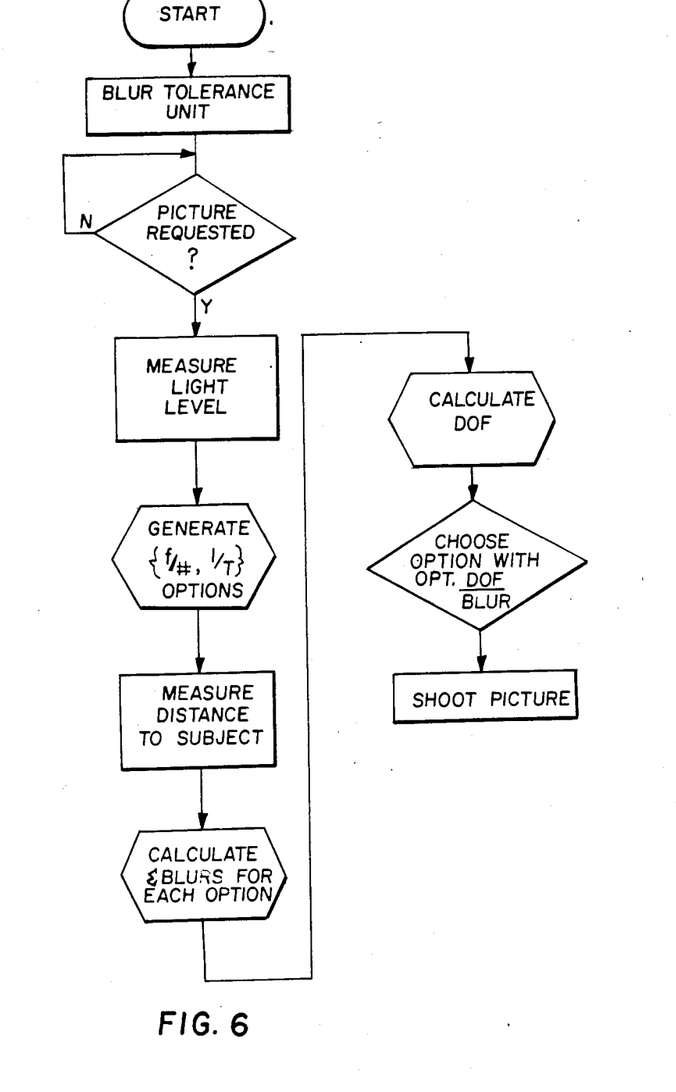
FIG. 6 is a flow chart showing the steps followed in determining the optimum exposure parameters.

The operation of exposure control 10 to obtain the optimum exposure parameters is shown in the flow chart of FIG. 6. An operator would depress a body release (not shown) in a camera to start the operation. When a picture has been requested, the light level of a scene is measured by light sensitive circuit 22. In response to a signal representing the measured light, logic and control unit 20 generates all of the possible aperture-shutter options within the capability of the system. The distance to the subject is then measured by rangefinding device 28, and a parasitic system blur (Equation (6)) and the blur remaining for depth of field (Equation (4)) are generated for each option. The depth of field is then found for each of the aperture-shutter options (Equations (2e), (2f), (5)). The option with the optimum depth of field to parasitic system blur ratio is selected, and the exposure is made with the exposure parameters corresponding to this option.

The optimization techniques of the present invention can also be used for electronic photography. In the use of these techniques in electronic photography, instead of generating pairs of aperture and shutter speed for exposure within the latitude of film, pairs are generated for a solid state sensor.

The invention has been described in detail with particular reference to a preferred embodiment thereof, but it will be understood that variations and modifications can be effected within the spirit and scope of the invention.

I claim:

1. An exposure control comprising:
   means for measuring the level of ambient light;
   means for generating a plurality of aperture-shutter options for said measured level of light;
   means for measuring the distance to a subject;
   means for determining a parasitic system blur for each of said options at said measured distance;
   means for determining a depth of field for each of said options;
   means for selecting the option with the optimum depth of field to blur ratio; and
   means for controlling an exposure in accordance with the option having said optimum ratio.

2. An exposure control, as defined in claim 1, wherein said means for determining said system blur includes means for determining a blur resulting from lenses, film, and paper.

3. An exposure control, as defined in claim 1, wherein said means for determining said system blur includes means for determining a blur resulting from camera shake.

4. An exposure control, as defined in claim 1, wherein said means for determining said system blur includes means for determining a blur resulting from subject motion.

5. An exposure control, as defined in claim 1, wherein said means for determining said system blur includes means for determining a blur resulting from diffraction.

6. An exposure control, as defined in claim 1, wherein said means for determining said system blur includes means for determining a blur resulting from focus errors.

7. An exposure control, as defined in claim 1, wherein said means for determining the maximum depth of field includes means for determining a quantity representing the difference between an acceptable blur diameter on a print and the parasitic system blur.

8. An exposure control, as defined in claim 1, wherein said optimum ratio is the ratio having a value closest to one.

* * * * *